Oct. 8, 1968  T. HAYFORD  3,404,787
SUCTION LIFT FOR ARTICLE DISTRIBUTION AND STORAGE SYSTEM
Filed Dec. 27, 1966  6 Sheets-Sheet 1

INVENTOR
THEODORE HAYFORD
BY
ATTORNEYS

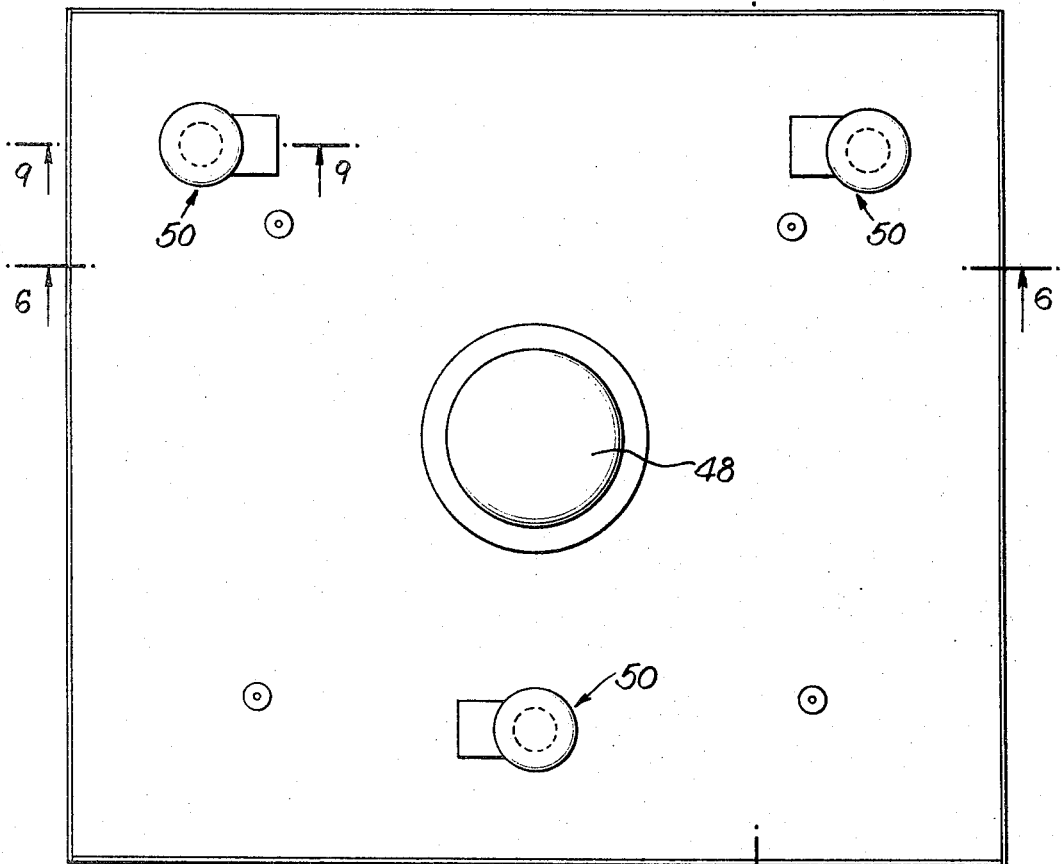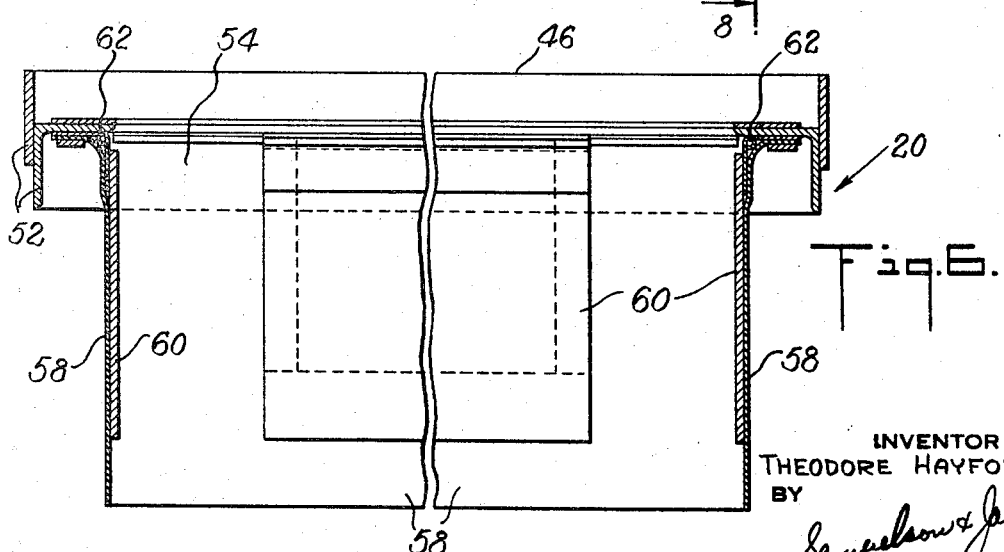

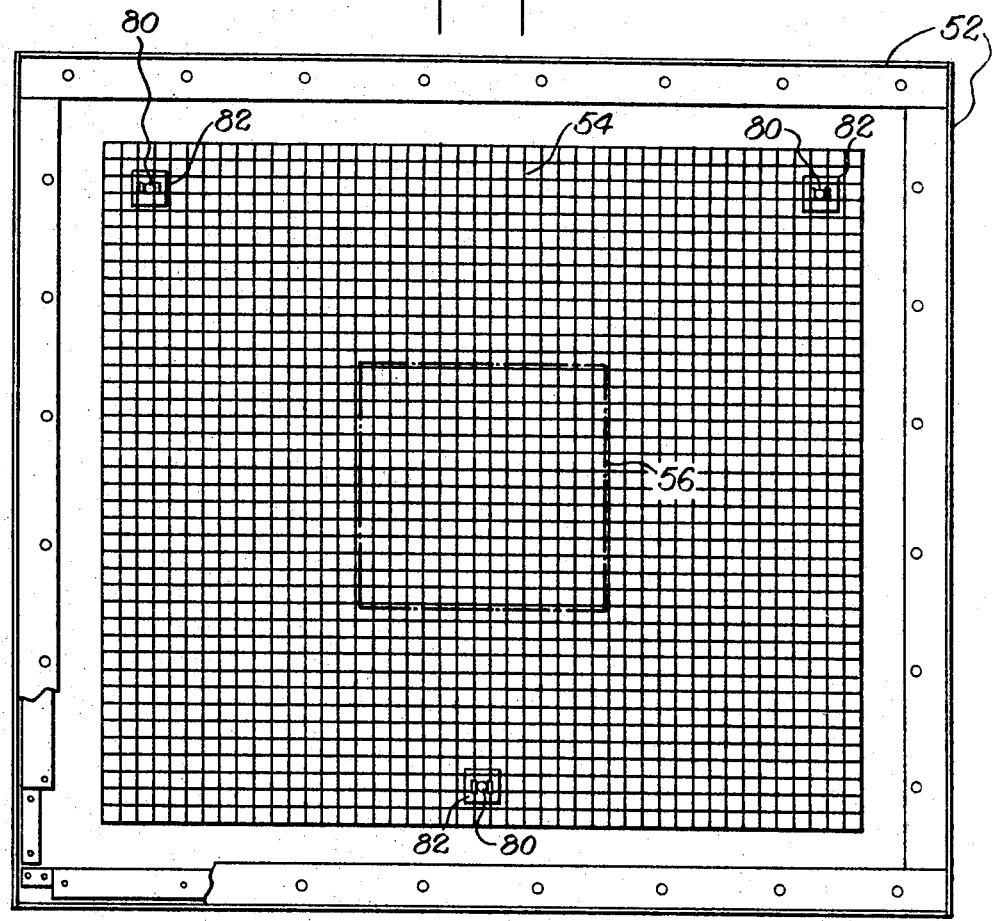
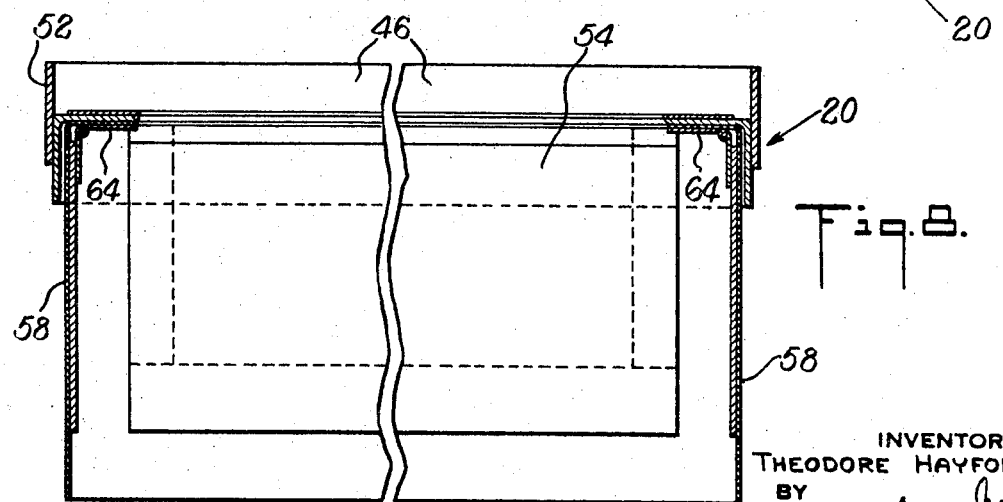

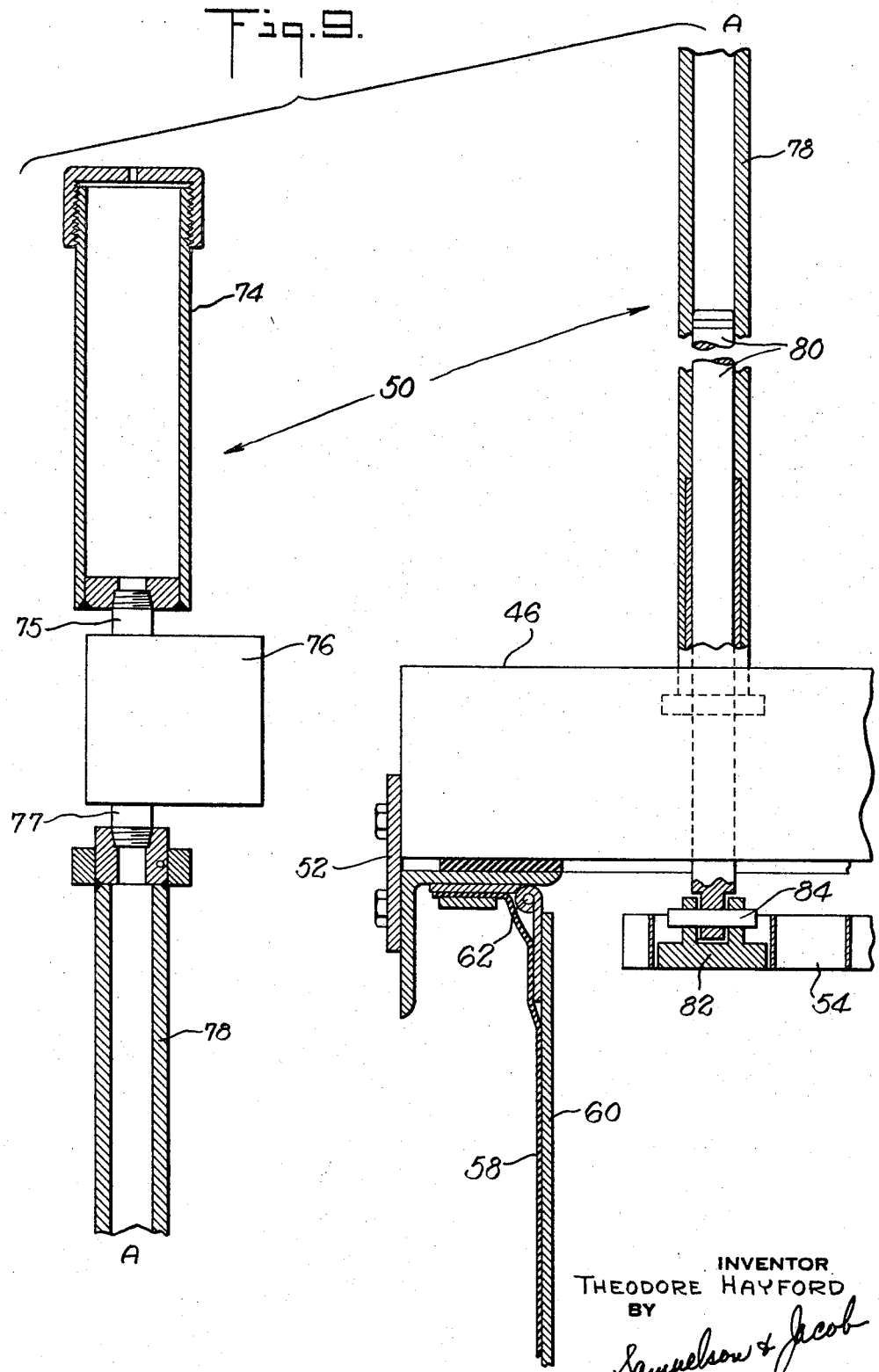

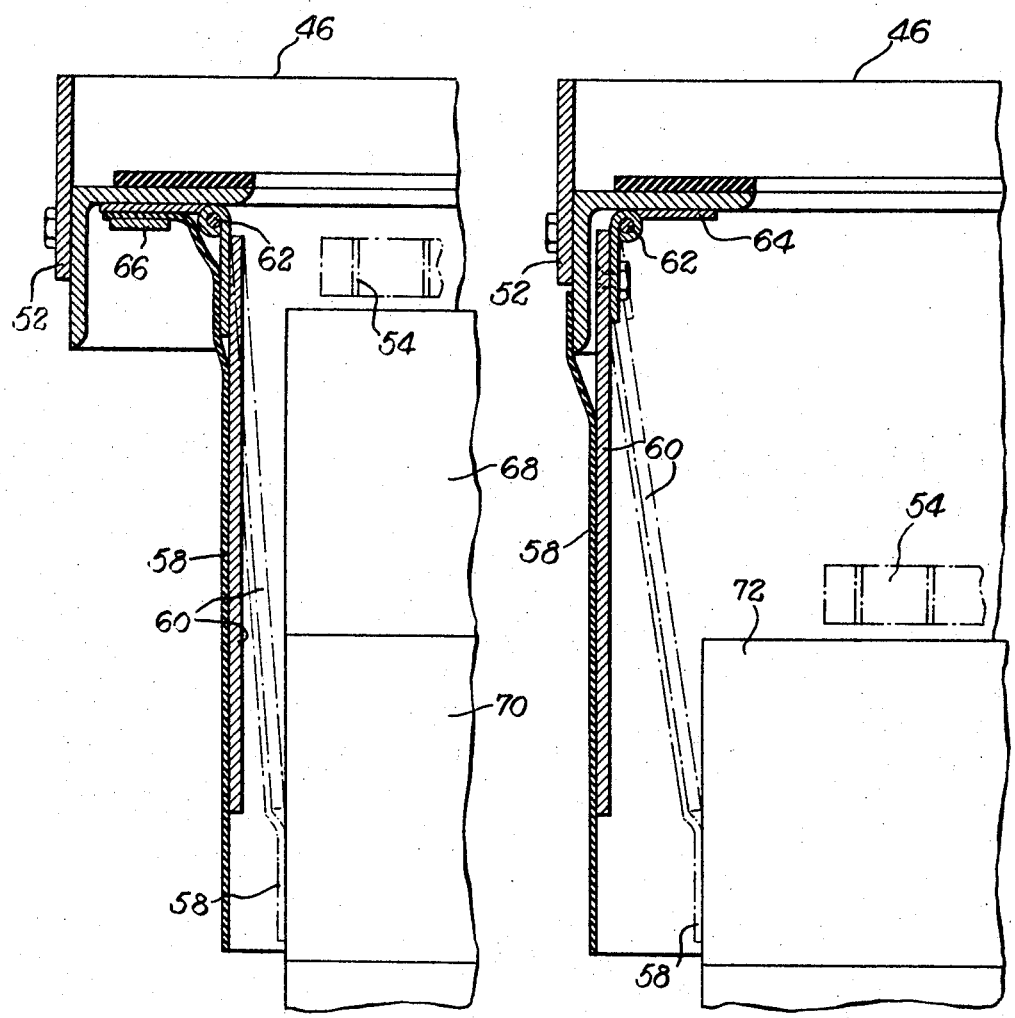

3,404,787
SUCTION LIFT FOR ARTICLE DISTRIBUTION AND STORAGE SYSTEM
Theodore Hayford, Glen Rock, N.J., assignor, by mesne assignments, to American Chain and Cable Company, Bridgeport, Conn.
Filed Dec. 27, 1966, Ser. No. 604,825
10 Claims. (Cl. 214—1)

The invention relates to suction lifts for article distribution and storage systems and in particular to those suction lifts which are used to lift a plurality of overlying tiers of units.

Prior art suction lifts such as are described in United States Patent 2,716,497 to E. A. Wahl et al., are utilized to lift a single tier of units and transfer the tier from a first position to a second position. United States Patent 2,880,030 to P. Horn describes a suction lift which contains a block which overlies a void in the tier of units to improve the lifting qualities of the lift when used with tiers having voids inside the periphery thereof.

Broadly, the lift of the invention comprises a hollow, movable head, an open grate which moves vertically with respect to the hollow, movable head and a flexible curtain depending from the rigid top of the hollow, movable head. The open grate is pervious to the movement of air so that the suction is readily applied through the grate. The grate is moved vertically downward from the rigid top of the head when a single tier of units is to be lifted and is moved upward toward the rigid top when more than one tier of units is to be lifted. Lifting of a plurality of tiers is improved if the depending curtain is held away from all but the lowermost of the tiers to be lifted when the suction is applied. This is accomplished by having at least one pair of opposed rigid plates hinged to the hollow, movable head so that the depending curtain is held away from the tiers with which the rigid plates make contact. This construction permits the lower portion of the depending curtain, which is completely flexible and not impeded by the presence of a rigid plate in its lowermost area, to make close contact with the units forming the periphery of the lowermost tier to be lifted and to provide good suction at the lowermost tier. So long as good suction is provided at the lowermost tier the lift may be used to lift that lowermost tier and all the tiers which overlie it.

It is an important object of the invention to provide a suction lift for article distribution and storage systems which may be used to lift more than one tier of units and transfer the tiers so lifted from a first position to a second position, to thereby increase the efficiency of transfer by twice or more.

It is a further object of the invention to provide such a suction lift wherein a vertically movable, open grate, which is pervious to air, is used to rest on top of the uppermost tier of units to be lifted.

It is a still further object of the invention to provide such a suction lift wherein there are at least two oppositely disposed plates inside the depending curtain located so that the plates prevent the depending curtain from making contact with any units of the tiers above the lowermost tier to be lifted.

It is a still further object of the invention to provide means for preselecting the position of the open grate within the suction lift and moving the open grate to such position.

It is a still further object of the invention to provide hydraulic means for such preselection.

These and other objects, features, advantages and uses will be apparent during the course of the following description when taken in conjunction with the accompanying drawings wherein:

FIGURE 5 is a top plan view of the suction lift of the invention;

FIGURE 6 is a vertical sectional view taken on the line 6—6 of FIGURE 5, viewed in the direction of the arrows;

FIGURE 7 is a bottom plan view of the suction lift of the invention showing the open grate;

FIGURE 8 is a vertical sectional view taken on the lines 8—8 of FIGURE 5, viewed in the direction of the arrows;

FIGURE 9 is an enlarged, vertical sectional view taken on the lines 9——9 of FIGURE 5, viewed in the direction of the arrows, showing the mechanism for raising and lowering the open grid element, the view being joined at the points A indicated thereon;

FIGURES 10 and 11 are detailed, vertical sectional views of the curtain supporting frames with the open grate shown in a raised and a lowered position;

Figure 1:
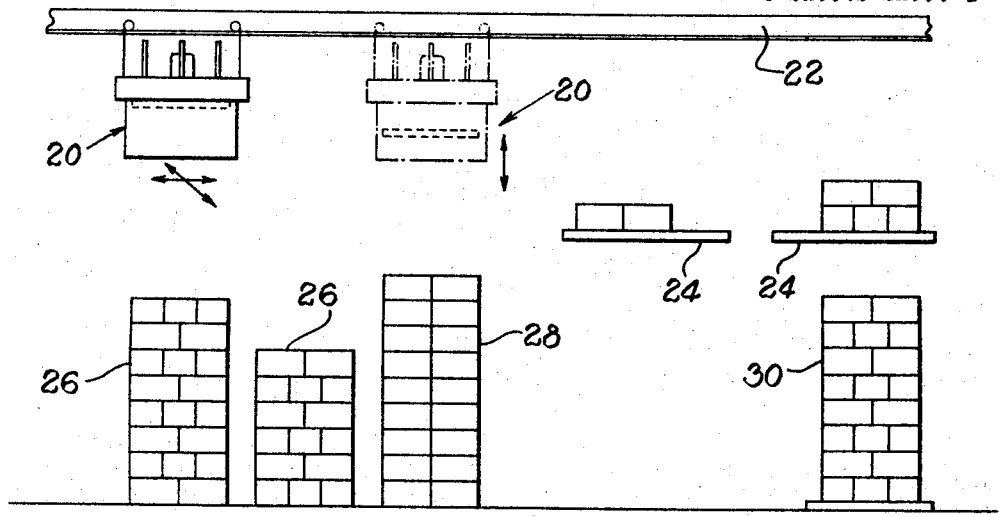
FIGURE 1 is a diagrammatic, end elevational view of an article distribution and storage system employing the suction lift of the invention.

In the drawings, wherein, for the purpose of illustration, are shown preferred embodiments of the suction lift of the invention, the numeral 20 designates a suction lift of the invention, generally. Suction lift 20 may be moved along upper trolley track 22 in a manner well known in the art. In many article distribution and storage systems, there are grids of orthogonal trolley tracks 22 so that the suction lift 20 may be moved over a large horizontal area. The crossed arrows in FIGURE 1 are used to illustrate the motion of suction lift 20 horizontally in the plane of the drawing and perpendicular to the plane of the drawing.

The suction lift 20 may also be moved vertically as indicated by the arrows at the right of the dotted, suction lift 20 in FIGURE 1. Suction lift 20 may be used to transfer tiers of product units from tables 24 to storage stacks 26 and 28 or pallet stack 30 or to transfer tiers of products units from stacks 26, 28 and 30 to tables 24 or to and from other locations in the article distribution and storage system. Suction lifts of the invention may be used in systems such as are described, for example, in United States Patent 3,262,584 to William H. Hayford, Jr. et al.

Since the suction lifts of the invention may pick up a plurality of tiers of units at a first position, transfer them to a second position, and deposit them at the second position, the transfer efficiency of the system is increased. Thus, if the suction always transfers two tiers instead of a single tier, the transfer efficiency will be doubled and if three tiers are transferred instead of one, it will be trebled. It can thus be seen that it is very advantageous to provide an efficient suction lift which will pick up, transfer and deposit a plurality of tiers of units with facility and consistence.

Figures 2, 3:
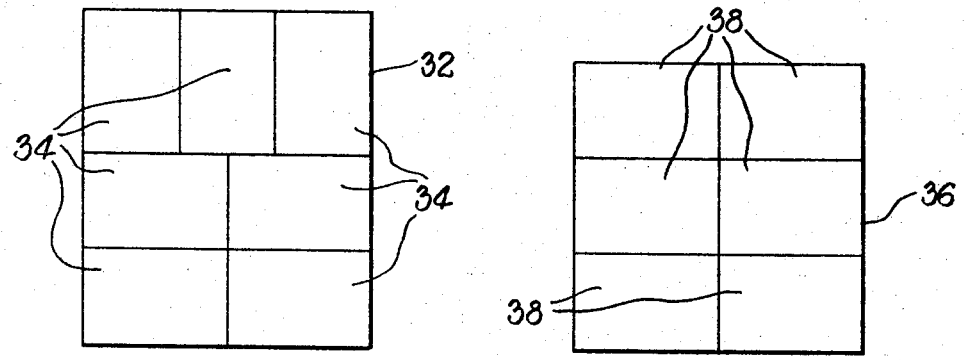
FIGURE 2 is a plan view of a typical, interlocked type, tier of units which may be lifted by the suction lift of the invention.
FIGURE 3 is a plan view of a typical columnar type tier of units which may be lifted by the suction lift of the invention.
Figure 4:
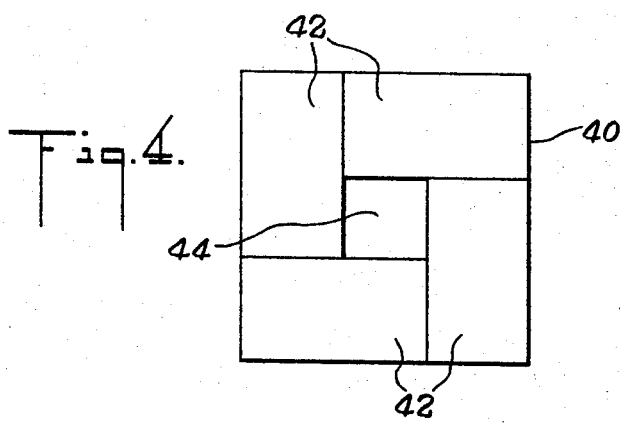
FIGURE 4 is a plan view of a typical, open type, tier of units which may be lifted by the suction lift of the invention, wherein there is a void in the interior of the tier.

FIGURES 2, 3 and 4 illustrate three tier configurations of many which may be handled by the suction lifts of the invention. FIGURE 2 shows tier 32 which is made up of equal units 34 and which may be used to form interlocking stacks such as stacks 26 and 30 of FIGURE 1 or columnar stacks such as stack 28 of FIGURE 1.

FIGURE 3 illustrates a tier 36 made up of equal units 38 which may be used to form interlocking stacks such as stacks 26 and 30 of FIGURE 1 or to form columnar stacks such as stack 28 of FIGURE 1. FIGURE 4 illustrates a tier 40 formed of equal units 42 and having a void 44 in the interior of the tier. These types of tiers may also be handled by suction lifts of the invention and formed in columnar stacks or in interlocking stacks in conjunction with other tier configurations.

It should be understood that the tier configurations illustrated are examples of types which may be handled by suction lifts of the invention and that the suction lift of the invention may be employed to handle many other tier configurations which are not illustrated herein.

FIGURE 5 is a top, horizontal, plan view of suction lift 20 showing the rigid top 46, suction motor and blower 48 and the open grate position selecting means 50. The construction of suction motor and blower 48 is well known in the art and one made in accordance with Wahl et al. Patent 2,716,497 or by other means is satisfactory for use with suction lift 20. The construction and operation of position selecting means 50 will be described in detail further on in this specification.

FIGURE 7 is a bottom plan view of suction lift 20 showing rigid top 46, rigid sides 52, open grate 54 and pad 56. Open grate 54 is pervious to air so it does not impede the action of the suction applied by the suction system. Pad 56, which is impervious to air, is placed in position on open grate 54 when suction lift 20 is to be used to handle tiers such as tier 40 (FIGURE 4) and is generally removed when tiers without interior voids are to be handled. However, on occasion, the pad may be left in place when handling tiers without interior voids.

Suction lift 20 (FIGURES 6 and 8) is seen to further comprise depending curtain 58 and rigid plates 60 which are hinged to top 46 by hinges 62 (FIGURE 6) and 64 (FIGURE 8). Both these types of hinges permit plates 60 to pivot inwardly toward the interior of the suction lift.

Usually the tiers of units to be handled take the shape of a parallelepiped and the depending curtains 58 overlap at the corners so that there is no air leakage when suction is applied. FIGURES 6 and 10 illustrate one construction for affixing the top of the depending, flexible curtain to the rigid top of the suction lift. As can be seen from the figures, curtain 58 is carried around the outside of hinge 62 and is suitably affixed to the under portion of the horizontal element of hinge 62 and the under portion of rigid top 46. It should be noted that curtain 58 is affixed to rigid top 46 along its full length in order to prevent any air leakage.

FIGURE 10 also serves to illustrate the action of the curtain 58 and the plate 60 when suction is applied to lift two tiers of units. Open grate 54 is in its upper position, resting on top of tier 68. When suction is applied, curtain 58 is drawn inward toward tier 70 and makes intimate contact with the lower portion of the periphery of the tier. As curtain 58 is drawn inward, plate 60 is pivoted inward under the urging of the curtain and the curtain and plate assume the position shown in the dashed lines of FIGURE 10. Since the plate serves to keep the curtain out of contact with the periphery of tier 68, it permits the maximum effect of the suction to be applied to tier 70. When the suction lift is raised, it picks up tier 70 and the overlying tier 68.

FIGURE 11 illustrates another construction for affixing the top of the depending curtain to the rigid top of the suction lift. As can be seen from the figure, curtain 58 is carried to the outside of the rigid side 52 and is glued or otherwise suitably affixed to it. FIGURE 11 also serves to illustrate the action of curtain 58 and plate 60 when suction is applied to lift a single tier of units. Open grate 54 is in its lower position, resting on top of tier 72. When suction is applied, curtain 58 is drawn inward toward tier 72 and makes intimate contact with the lower portion of the periphery of the tier. As curtain 58 is drawn inward, plate 60 is also drawn inward under the urging of the curtain until they assume the position shown in the dashed lines of FIGURE 11. Since the plate 60 does not extend down to the bottom of tier 72, the lower portion of curtain 58 makes contact with the periphery of the tier and enables the suction lift to lift and transfer the tier.

While all of the examples illustrated in this specification show the use of four rigid plates around the sides of a parallelepiped, I have found that a single pair of oppositely disposed plates enable me to lift and transfer a plurality of tiers of units. So long as a portion of the depending curtain is held away from all but the lower tier to be lifted, good holding suction is obtained. The figures also show the device of the invention being used to lift one or two tiers of units but it may also be used to lift and transfer more than two tiers so long as the depending curtain is held away from at least two sides of the periphery of all but the lowermost tier to be handled.

The hinged, rigid plates also serve to clamp the units of a partial tier in order to permit the suction lift to handle the units.

In FIGURE 9 there is illustrated one position selecting means 50, joined at the points A indicated thereon, which is used to lock the open grate 54 in position with respect to the rigid top 46. While it is preferable to utilize three such position selecting, moving means in suction lifts of the invention, it is possible to use a single such unit satisfactorily. Means 50 is seen to comprise hydraulic reservoir 74, hydraulic valve 76, piston housing 78 and piston rod 80. Hydraulic reservoir 74 is connected to hydraulic valve 76 by means of nipple 75 and valve 76 is connected to piston housing 78 by means of nipple 77. Yoke 82 is a part of open grate 54 and piston 80 is joined to it by means of pin 84.

Hydraulic valve 76 is controlled manually or by means of a limit switch (not shown) in a manner well known in the art. With valve 76 open, the incompressible fluid contained in reservoir 74 is free to flow into the piston housing 78. It is also within the contemplation of the invention to use mechanical means such as a rack and pinion or other mechanical or electrically operated means in place of the hydraulic means 50 illustrated and described.

When valve 76 is open and the incompressible fluid contained in the reservoir 74 is free to flow into piston housing 78, open grate 54 will drop down until it is pendent from the chains 88. Sometimes, it will be in contact with the top of the uppermost tier of units and sometimes it will be suspended above the tiers of units. The restraining chains 88 shown in FIGURES 14 and 15 also serve to prevent the open grate from dropping free of the suction lift.

The head is now lowered until the grate makes contact with the top of the uppermost tier and the head continues down until the bottom of the depending curtain is around the lowermost tier to be lifted. The motion of the head is stopped depending upon the setting of the hydraulic valves. The operation of the hydraulic valves may be controlled by limit switches, slack chain sensors or similar devices which are well known in the art.

After the head has reached its predetermined position with respect to the tiers of units and the grate and the valve 76 has been closed, suction is applied by means of suction motor and blower 48. This causes the depending curtain to surround the periphery of the lowermost tier to be lifted and to pull the lowermost tier and all those above it against the restrained open grate. Now, the suction lift may be moved to the second position at which the tiers are to be deposited, the suction lift is lowered into position and the suction is removed. The depending curtain releases its hold on the tiers of units and when the suction lift is raised, the tiers remain at the new location.

Figure 12:
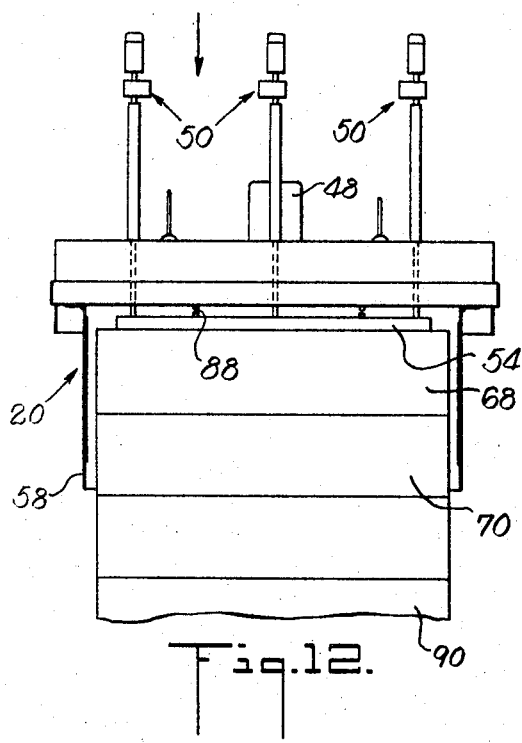
FIGURES 12 and 13 are schematic views showing the operation of the suction lift of the invention with the open grate in its upper position.
Figure 13:
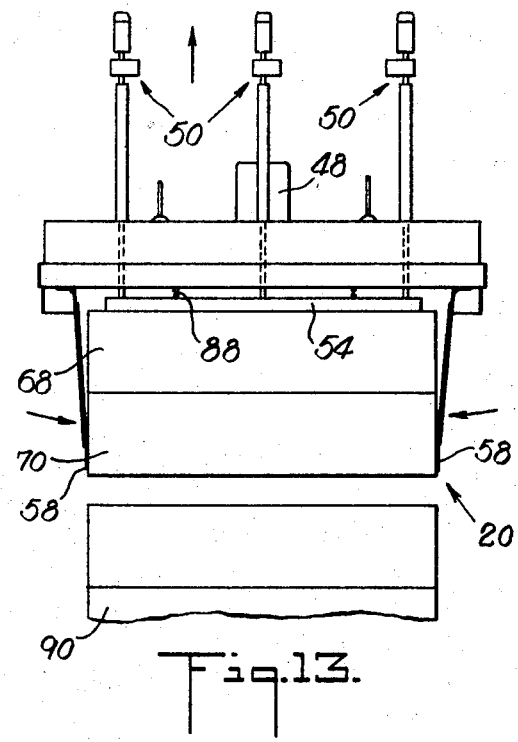

FIGURES 12 and 13 illustrate the operation of the suction lift of the invention when a plurality of tiers of units are to be handled. As the head and pendent grate 54 drop onto the top of tier 68, the valve 76 is open so that the fluid flows out of the piston housing. Now, the suction is applied by means of suction motor and blower 48 so that curtain 58 closes around tier 70. The suction also holds grate 54 in the uppermost position. The suction lift is now lifted so that the tiers held by it are removed from the stack 90 and the tiers are transferred to the desired position and deposited by removing the suction.

Figure 14:
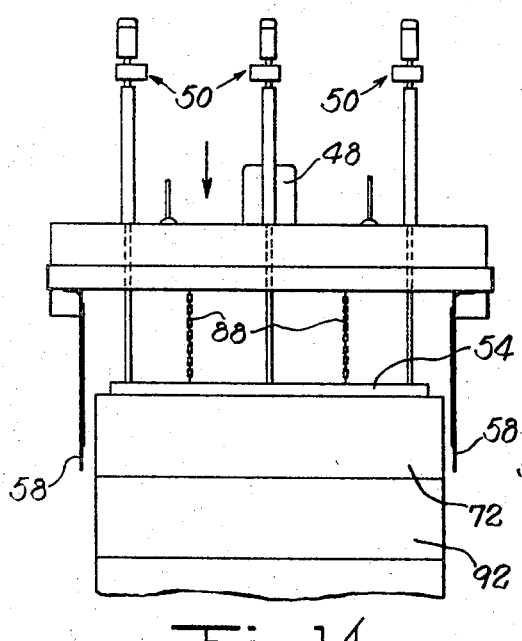
FIGURES 14 and 15 are schematic views of the suction lift of the invention showing the open grate in a lower position.
Figure 15:
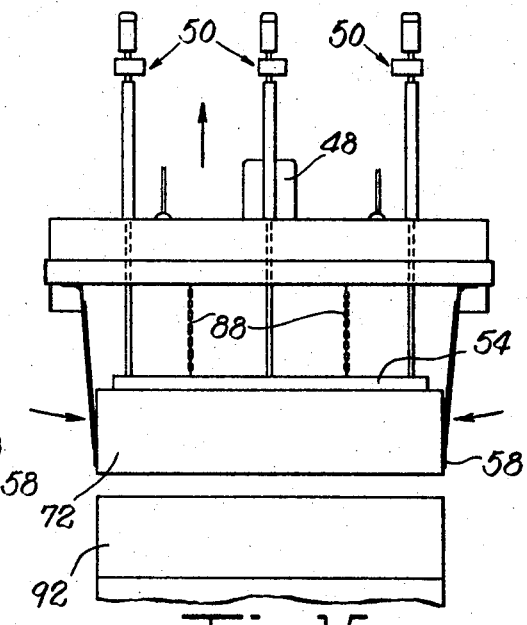

FIGURES 14 and 15 illustrate the operation of the suction lift of the invention in handling a single tier or a plurality of relatively flat tiers. Valve 76 is opened so that fluid enters the piston housing and grate 54 is dropped until it is pendent from the head on chains 88. The head and grate are lowered until the grate rests on top of tier 72. The head now continues to be lowered until the desired position is reached. The position of the head with respect to the grate is sensed in a manner well known in the art as the head is lowered and when this predetermined position is reached, the valve 76 is closed. With the valve closed, the incompressible fluid will remain in the piston housing. Now, when suction is applied by suction motor and blower 48, grate 54 will stay in a lowered position with respect to the top of the suction lift because of the force exerted by the fluid in the piston housings. The application of the suction causes the curtain 58 to contact the periphery of the tier 72 and hold it in the head. The tier may now be lifted from the stack 92, moved to its desired position and deposited on another stack, a conveyor or a table.

It can be seen from the foregoing that it is possible to select the position of the open grate 54 with respect to the top 46 of the head depending upon the height and number of tiers to be handled by the device.

As various changes could be made in the above construction without departing from the scope of the invention, it is intended that all matter contained in the above description or shown in the accompanying drawings shall be interpreted as illustrative and not in a limiting sense.

What is claimed is:

1. In an article distribution and storage system, a suction lift for transferring at least one tier formed of a plurality of units from a first position to a second position comprising:
   - a hollow, movable head having a rigid top and a depending flexible curtain adapted to encircle the units forming the tier and to engage the sides of the units forming the periphery of the tier in substantially air-tight manner;
   - an open grate pervious to the passage of air mounted within the hollow, movable head below the rigid top and vertically movable with respect to the rigid top;
   - means for selecting the position of the open grate with respect to the hollow, movable head and to a stack of tiers of units located at the first position such that the open grate rests on the tops of the units forming the uppermost tier of the stack and the depending flexible curtain surrounds the periphery of the units forming the lowermost tier to be lifted by the lift;
   - means to create a predetermined suction within the hollow, movable head such that the depending flexible curtain engages the units of the lowermost tier to be lifted by the lift in said substantially air-tight manner;
   - means for moving the hollow, movable head, the tier of units engaged in said substantially air-tight manner and the tiers of units above said engaged tier of units from the first position to the second position; and
   - means to release the suction to thereby deposit the engaged tier of units and the tiers of units above said engaged tier of units in the second position.

2. The invention of claim 1 including a pair of oppositely disposed, vertically mounted plates pivotable with respect to the rigid top;
   each such rigid plate being mounted inside the depending flexible curtain and being of such size that when the predetermined suction is created within the hollow, movable head, the depending curtain is held out of contact with the units of the upper tiers and only engages the periphery of the units forming the lowermost tier to be lifted.

3. The invention of claim 2 wherein the tiers of units are the shape of a parallelepiped and there are two pairs of oppositely disposed, vertically mounted plates, there being one such face corresponding to each side of the parallelepiped.

4. The invention of claim 3 wherein the means for selecting the position of the open grate with respect to the hollow, movable head comprises at least one hydraulic valve.

5. The invention of claim 2 wherein the means for selecting the position of the open grate with respect to the hollow, movable head comprises at least one hydraulic valve.

6. The invention of claim 1 wherein the means for selecting the position of the open grate with respect to the hollow, movable head comprises at least one hydraulic valve.

7. The invention of claim 1 wherein the tier of units contains an internal opening therein and including a pad impervious to the passage of air of such size and position so as to overlie and seal the internal opening in the tier of units.

8. The invention of claim 7 including a pair of oppositely disposed, vertically mounted plates pivotable with respect to the rigid top;
   each such rigid plate being mounted inside the depending flexible curtain and being of such size that when the predetermined suction is created within the hollow, movable head, the depending curtain is held out of contact with the units of the upper tiers and only engages the periphery of the units forming the lowermost tier to be lifted.

9. The invention of claim 8 wherein the tiers of units are the shape of a parallelepiped and there are two pairs of oppositely disposed, vertically mounted plates, there being one such face corresponding to each side of the parallelepiped.

10. The invention of claim 9 wherein the means for selecting the position of the open grate with respect to the hollow, movable head comprises at least one hydraulic valve.

References Cited

UNITED STATES PATENTS 3,313,568  4/1967  Fogg _____ 294—64
3,338,615  8/1967  Fogg _____ 294—64

ROBERT G. SHERIDAN, *Primary Examiner.*

GEORGE F. ABRAHAM, *Assistant Examiner.*